US008740276B2

(12) United States Patent
Takeyoshi

(10) Patent No.: US 8,740,276 B2
(45) Date of Patent: Jun. 3, 2014

(54) MOLDING END CAP

(71) Applicant: Katayama Kogyo Co., Ltd., Ibara-Shi (JP)

(72) Inventor: Osamu Takeyoshi, Ibara (JP)

(73) Assignee: Katayama Kogyo Co., Ltd., Ibara-Shi (JP)

( * ) Notice: Subject to any disclaimer, the term of this patent is extended or adjusted under 35 U.S.C. 154(b) by 0 days.

(21) Appl. No.: 14/050,654

(22) Filed: Oct. 10, 2013

(65) Prior Publication Data

US 2014/0035307 A1    Feb. 6, 2014

Related U.S. Application Data

(63) Continuation of application No. PCT/JP2012/058303, filed on Mar. 29, 2012.

(30) Foreign Application Priority Data

Apr. 13, 2011    (JP) ................................. 2011-089343

(51) Int. Cl.
     *B62D 39/00*      (2006.01)
     *B60R 13/04*      (2006.01)

(52) U.S. Cl.
     CPC ...................................... *B60R 13/04* (2013.01)
     USPC ......................................... 296/1.08; 52/716.5

(58) Field of Classification Search
     CPC .................................................... B60R 13/04
     USPC .................................. 296/1.08; 293/128, 154
     See application file for complete search history.

(56) References Cited

U.S. PATENT DOCUMENTS

| 3,359,030 | A | * | 12/1967 | Newman | 293/128 |
| 4,015,760 | A | * | 4/1977 | Bott | 224/324 |
| 4,066,285 | A | * | 1/1978 | Hall et al. | 293/120 |
| 4,617,209 | A | * | 10/1986 | Ives | 428/31 |
| 6,328,359 | B1 | * | 12/2001 | Pacella et al. | 293/128 |
| 7,055,291 | B2 | * | 6/2006 | Nakanishi et al. | 52/716.5 |
| 7,407,205 | B2 | * | 8/2008 | Nakao et al. | 293/128 |
| 8,505,990 | B2 | * | 8/2013 | Czopek et al. | 293/102 |

FOREIGN PATENT DOCUMENTS

JP      57-155134 A1    9/1982

(Continued)

OTHER PUBLICATIONS

International Search Report dated Jun. 5, 2012.

*Primary Examiner* — Lori Lyjak
(74) *Attorney, Agent, or Firm* — Burr & Brown, PLLC

(57) ABSTRACT

A molding end cap includes an end section and an insertion section that is inserted into a molding main body. The molding main body includes an outer surface section and a bent section. One of the insertion section and the bent section includes an engagement protrusion and the other thereof includes an insertion slope section and a hooking section. The engagement protrusion undergoes elastic deformation by the insertion slope section in a deformation direction that intersects an insertion direction. The hooking section holds the engagement protrusion in a state in which the engagement protrusion is restored from elastic deformation. The engagement protrusion formed in a shape of a rib ensures that the engagement protrusion is deformed to only a small extent in the insertion direction but easily undergoes elastic deformation in the deformation direction.

6 Claims, 8 Drawing Sheets

(56) References Cited

FOREIGN PATENT DOCUMENTS

| | | |
|---|---|---|
| JP | 60-024659 U | 2/1985 |
| JP | 05-082694 U | 11/1993 |
| JP | 09-099787 A1 | 4/1997 |
| JP | 2005-104168 A1 | 4/2005 |
| JP | 2005-254904 A1 | 9/2005 |
| JP | 2008-018895 A1 | 1/2008 |
| JP | 2010-143556 A1 | 7/2010 |

* cited by examiner

CROSS-SECTIONAL VIEW TAKEN ALONG LINE A-A

CROSS-SECTIONAL VIEW TAKEN ALONG LINE B-B

CROSS-SECTIONAL VIEW TAKEN ALONG LINE C-C

CROSS-SECTIONAL VIEW
TAKEN ALONG LINE D-D

CROSS-SECTIONAL VIEW
TAKEN ALONG LINE E-E

MOLDING END CAP

TECHNICAL FIELD

The present invention relates to an end cap that is fitted into the end of a molding that is attached to a car body, a car door, or the like.

BACKGROUND ART

An end cap may be fit a car body, a roof molding that is attached to the roof of a car body, or a beltline molding that is attached to the edge of a door window opening, the end cap providing the end of the molding with a design, and functioning as a protector for the end of the molding.

Such a molding is normally produced by forming a long product by extrusion, roll forming, or the like, and cutting the long product after optional pressing, bending, or the like.

Therefore, the end of the molding main body has an opening, and an end cap is normally inserted into the opening.

The end cap includes an end section that closes the open end face of the molding main body, and provides a design or functions as a protector, and an insertion section that protrudes from the end section, and is inserted into the opening of the molding main body.

A number of end caps have been proposed, such as an end cap that is configured so that the insertion section of the end cap is inserted into the opening of the end of the molding main body, and secured through engagement of a protrusion and a recess (see Patent Document 1), and an end cap that is configured so that the hooking piece formed on the insertion section is caused to engage the inner side of the molding main body (see Patent Document 2). However, these end caps have a problem in that the end cap may be easily removed from the molding main body, or a space or backlash may occur between the end of the end cap and the open end face of the molding main body.

The two-step hooking section disclosed in Patent Document 1 is effective for suppressing a backlash. However, since the hooking section is formed on a leaf spring, it is difficult to reliably prevent removal of the end cap due to the deformation force of the leaf spring.

In the field of a beltline molding or the like (see FIG. 10), the insertion section 110 of the end cap may be inserted into the opening of the end of the molding main body 120, a hole may be formed in the molding main body and the insertion section of the end cap using a drill or the like, and the securing pin 130 may be inserted by press fitting using an area under the lip 125. However, the above method has a problem in that it may be difficult to press-fit the securing pin 130, and the securing pin 130 may be removed due to vibrations that occur during travel.

The above method has another problem in that expensive production equipment may be required, or the production man-hours may increase, or the tact time for production may increase.

Patent Document 1: JP-A-2005-104168
Patent Document 2: JP-UM-A-5-82694

SUMMARY OF THE INVENTION

Technical Problem

An object of the invention is to provide a molding end cap that can be easily inserted into the molding main body, is not easily removed (withdrawn) from the molding main body, and can suppress a backlash.

Solution to Problem

According to one aspect of the invention, there is provided a molding end cap that is fitted into an end of a molding main body, the molding end cap comprising an end section that closes an open end of the molding main body, and an insertion section that protrudes from the end section, and is inserted into an opening of the molding main body, the molding main body including an outer surface section, and a bent section that is bent inward from the outer surface section on an inner side of the molding main body, one of the insertion section of the end cap and the bent section of the molding main body including an engagement protrusion, and the other of the insertion section of the end cap and the bent section of the molding main body including an insertion slope section and a hooking section, the engagement protrusion coming in sliding contact with the insertion slope section, and undergoing elastic deformation in a deformation direction that perpendicularly intersects an insertion direction when the insertion section of the end cap is inserted into the opening of the molding main body, and the hooking section being formed by forming a cut on a back side relative to the insertion slope section, and holding the engagement protrusion in a state in which the engagement protrusion is restored from elastic deformation, and the engagement protrusion being formed in a shape of a rib that ensures that the engagement protrusion is deformed to only a small extent in the insertion direction, but easily undergoes elastic deformation in the deformation direction.

The term "outer surface section" used herein in connection with the molding main body refers to a section that serves as an exterior design surface when the molding main body (molding) is attached to a car body, a car door, or the like. The term "inner side" used herein in connection with the molding main body refers to a side that is attached to a car body, a car door, or the like.

The front side and the rear side of the insertion section of the end cap are defined along the insertion direction of the end cap. The open end side of the molding main body and the back side of the molding main body opposite to the open end side are defined along the longitudinal direction of the molding main body.

The above molding end cap is characterized in that one of the end cap and the bent section of the molding main body includes the engagement protrusion that is deformed to only a small extent in the insertion direction of the end cap, but easily undergoes elastic deformation in the deformation direction that perpendicularly intersects the insertion direction, and the other of the end cap and the bent section of the molding main body includes the hooking section that causes the engagement protrusion to undergo elastic deformation and to be restored from elastic deformation and held in the insertion direction that perpendicularly intersects the protrusion direction.

A related-art end cap may be configured so that the engagement protrusion undergoes elastic deformation in the protrusion direction. According to the above molding end cap, since the engagement protrusion is caused to undergo elastic deformation in the deformation direction that perpendicularly intersects the protrusion direction, deformation of the engagement protrusion can be suppressed in the direction in which the end cap is removed. Therefore, the end cap is not easily removed from the molding main body.

Moreover, the engagement protrusion is caused to undergo elastic deformation sideways, the protrusion height of the engagement protrusion can be sufficiently increased.

When forming the engagement protrusion on the end cap, it is preferable that the insertion section of the end cap include the engagement protrusion that is positioned on the back side of the insertion section, and protrudes in the direction that perpendicularly intersects the insertion direction, and the bent section of the molding main body include the insertion slope section that causes the engagement protrusion to undergo elastic deformation in the vertical direction when the end cap is inserted into the molding main body, and the hooking section that is formed by forming the cut on the back side relative to the insertion slope section.

In order to effectively prevent a backlash of the end cap, it is preferable that the side surface of the hooking section of the molding main body be formed by a hooking slope section, the hooking slope section being in the shape of a slope that is formed so that the bottom thereof is positioned on the back side of the molding main body relative to the top thereof.

In order to reduce the force required to insert the end cap, and prevent a situation in which the end cap is easily removed, it is preferable that the insertion section of the end cap include a hollow section that extends along the insertion direction, the hollow section being positioned offset relative to the engagement protrusion toward the deformation direction, and the engagement protrusion undergoing elastic deformation at the position of the base end thereof through deformation of the hollow section.

In this case, it is more preferable that the engagement protrusion be positioned between the front end and the rear end of the hollow section in the insertion direction, and an engagement side surface of the engagement protrusion be positioned on the side of the rear end of the hollow section relative to the center of the hollow section in the insertion direction.

Advantageous Effects of the Invention

Since the above molding end cap includes the engagement protrusion that is deformed to only a small extent in the insertion direction, but easily undergoes elastic deformation in the deformation direction that perpendicularly intersects the insertion direction, and the engagement protrusion is caused to undergo elastic deformation in the vertical direction or the interior-exterior direction of the vehicle that perpendicularly intersects the insertion direction when the end cap is inserted, the force required to insert the end cap can be reduced, and the engagement protrusion rarely undergoes elastic deformation in the direction in which the end cap is removed. Therefore, the end cap is not easily removed from the molding main body.

When the hollow section that is positioned offset relative to the rib-shaped engagement protrusion toward the deformation direction in which the engagement protrusion undergoes elastic deformation is provided in the insertion section of the end cap along the insertion direction, the base end of the rib is deformed along the deformation direction of the rib, and the force required to insert the end cap can be further reduced.

When the hollow section is formed so that the rib-shaped engagement protrusion is positioned between the front end and the rear end of the hollow section, and the engagement side surface of the engagement protrusion is positioned on the side of the rear end of the hollow section relative to the center of the hollow section, the deformation force is applied to the side surface of the engagement protrusion that faces to the direction perpendicularly intersecting the insertion direction when the end cap is inserted, and deformation mainly occurs at the center of the hollow section. Since the engagement side surface of the engagement protrusion is positioned in the vicinity of the rear end of the hollow section when removal of the end cap may occur, the base end of the engagement protrusion is deformed to only a small extent, and the end cap is not easily removed from the molding main body.

BRIEF DESCRIPTION OF DRAWINGS

FIGS. 3A to 3C illustrate deformation of the engagement protrusion and the hollow section that occurs when the end cap is inserted into the molding main body, wherein FIG. 3A illustrates a state in which the engagement protrusion has come in contact with the insertion slope section, FIG. 3B illustrates a state in which the engagement protrusion and the hollow section have undergone downward elastic deformation, and FIG. 3C illustrates a state in which the engagement protrusion and the hollow section have been restored from elastic deformation.

FIGS. 4A to 4C are cross-sectional views illustrating the molding, wherein FIG. 4A is a cross-sectional view taken along the line A-A, FIG. 4B is a cross-sectional view taken along the line B-B, and FIG. 4C is a cross-sectional view taken along the line C-C.

FIGS. 5A to 5C illustrate an example of the end cap fitting structure according to the second embodiment, wherein FIG. 5A illustrates a state before the end cap is inserted into the molding main body, FIG. 5B illustrates a state in which the end cap is being inserted into the molding main body, and FIG. 5C illustrates a state after the end cap has been completely inserted into the molding main body.

FIGS. 6A to 6C are side views (inner side views) illustrating the end cap according to the second embodiment, wherein FIG. 6A illustrates a state when the end cap has been inserted into the molding main body to some extent, FIG. 6B illustrates a state in which the end cap is being inserted into the molding main body, and FIG. 6C illustrates a state after the end cap has been completely inserted into the molding main body.

FIGS. 7A to 7D illustrate an example of the end cap fitting structure according to the third embodiment, wherein FIG. 7A illustrates a state before the end cap is inserted into the molding main body, FIG. 7B illustrates a state after the end cap has been completely inserted into the molding main body, FIG. 7C is a cross-sectional view taken along the line D-D, and FIG. 7D is a cross-sectional view taken along the line E-E.

REFERENCE SIGNS LIST

Figure 1:
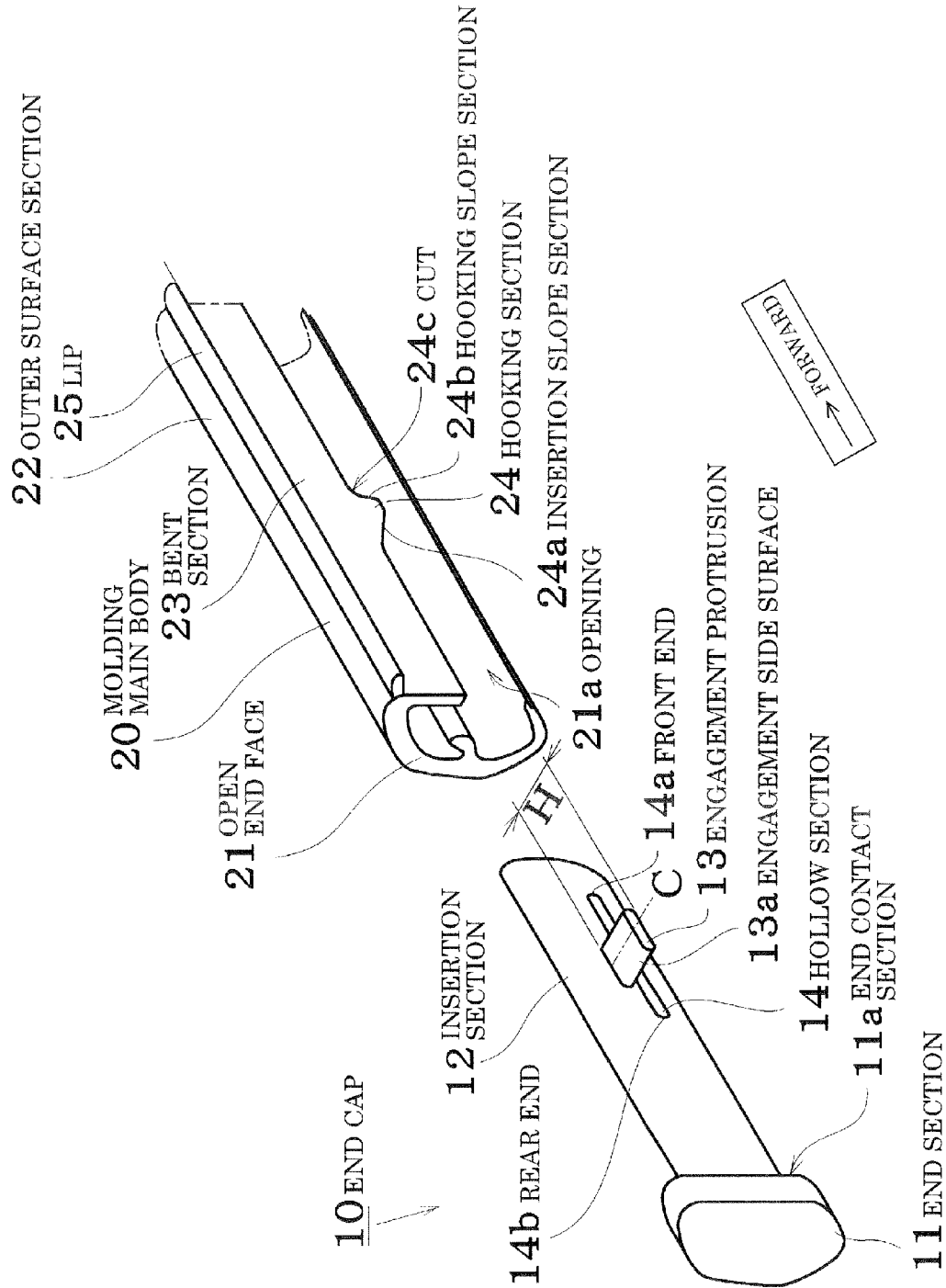
FIG. 1 is a perspective view illustrating a state before the end cap is inserted into the molding main body.
Figure 2A:
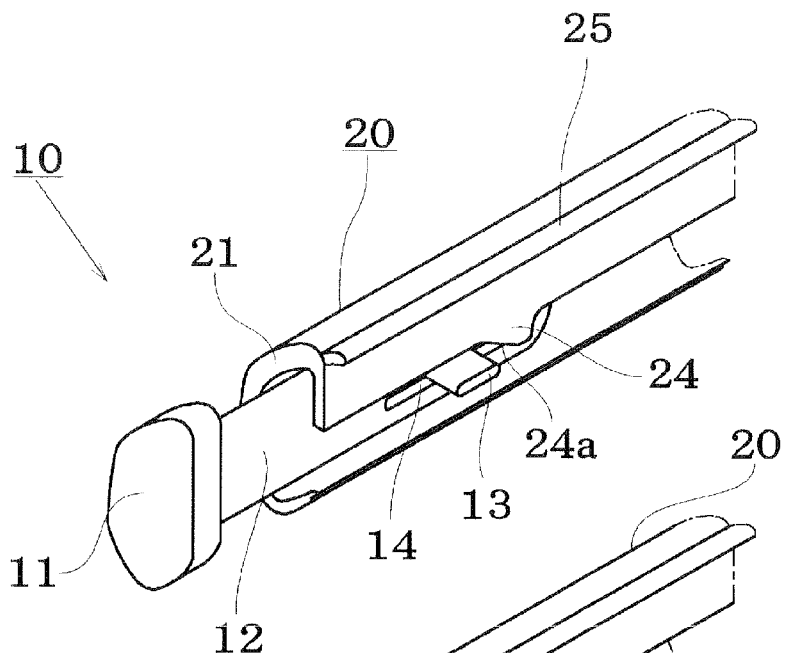
FIGS. 2A to 2C illustrate a process in which the end cap is inserted into the molding main body.
Figure 2B:
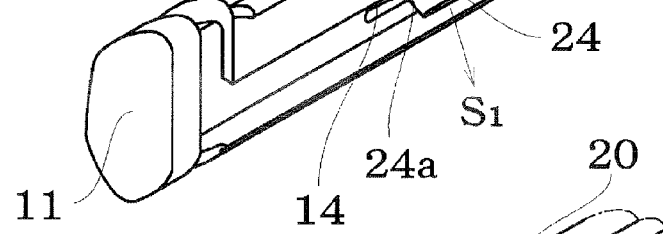
Figure 2C:
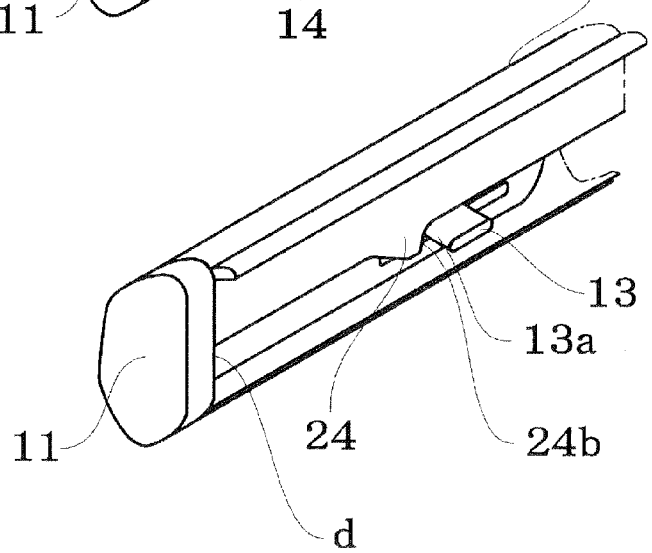

10 End cap
11 End section
11a End contact section
12 Insertion section
13 Engagement protrusion
13a Engagement side surface
14 Hollow section
14a Front end
14b Rear end 20 Molding main body
21 Open end face
21a Opening
22 Outer surface section
23 Bent section
24 Hooking section
24a Insertion slope section
24b Hooking slope section
24c Cut
25 Lip

DESCRIPTION OF EMBODIMENTS

Examples of molding end cap fitting structures according to several embodiments of the invention are described below taking a beltline molding as an example. Note that the invention may also be applied to various other moldings.

In a first embodiment illustrated in FIG. 1, an end cap 10 includes an end section 11 that is configured to close an open end face 21 of a molding main body 20, and an insertion section 12 that protrudes from an end contact section 11a of the end section 11.

The insertion section 12 is inserted into an opening 21a of the molding main body 20 through the open end face 21. The insertion section 12 includes an engagement protrusion 13 that is positioned on the back side of the insertion section 12, and protrudes in an interior direction (i.e., a direction toward the interior of a car) that perpendicularly intersects the insertion direction.

Figure 3A:
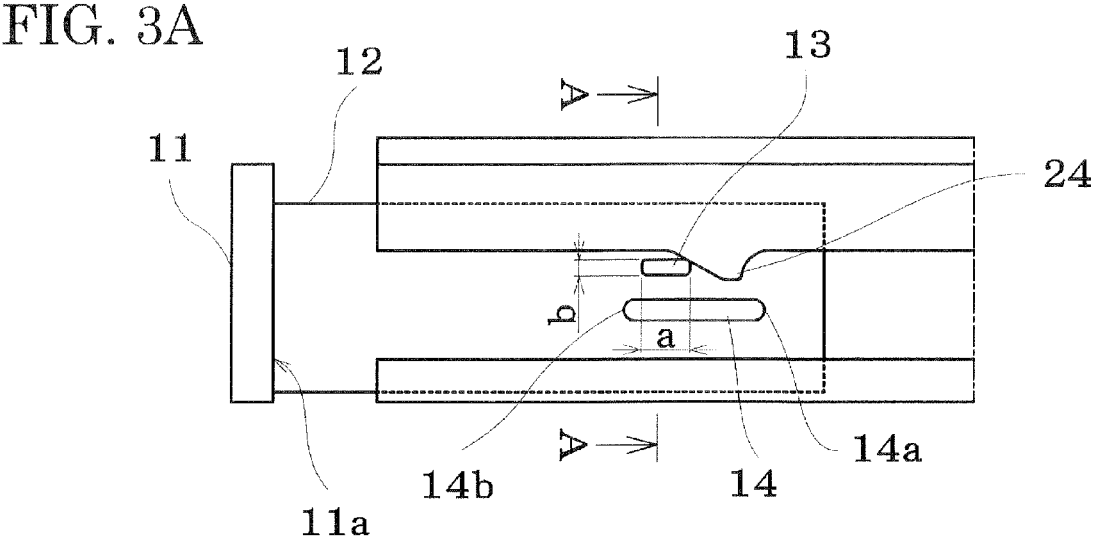

The engagement protrusion 13 is formed in the shape of a rib (protruding piece) that has a small dimension (thickness) b in the vertical direction (i.e., a direction that perpendicularly intersects the insertion direction), and has a relatively large dimension a in the insertion direction (see FIG. 3A).

Therefore, the engagement protrusion 13 easily undergoes elastic deformation in the vertical direction, but is deformed to only a small extent in the insertion direction.

A hollow section 14 (long hole) is formed under the engagement protrusion 13 (i.e., positioned offset relative to the engagement protrusion 13 toward the deformation direction in which the engagement protrusion 13 undergoes elastic deformation) along the insertion direction.

The molding main body 20 includes an outer surface section 22 that serves as an exterior design surface in a state in which the molding main body 20 is attached to a door, and a bent section 23 that is bent inward on the inner side of the molding main body 20, and has a cross-sectional shape approximately in the shape of the letter "C". Since the molding main body 20 is used as a beltline molding, the molding main body 20 includes a lip 25 that comes in sliding contact with a door glass window.

In the first embodiment illustrated in FIG. 1, the molding main body 20 includes a hooking section 24 that spreads toward the bottom, the hooking section 24 having an insertion slope section 24a that is positioned on the side of the open end face 21, and a hooking slope section 24b that is formed by forming a cut 24c on the back side relative to the insertion slope section 24a.

Specifically, the insertion slope section 24a is a slope that is formed so that the bottom thereof is positioned closer to the open end face 21 of the molding main body 20 than the top thereof, and the hooking slope section 24b is a slope that is formed so that the bottom thereof is positioned further away from the open end face 21 of the molding main body 20 than the top thereof.

When the end cap 10 is inserted through the end of the molding main body 20, the engagement protrusion 13 and the hollow section 14 undergo elastic deformation (see FIGS. 2A to 4C).

Specifically, when the insertion section 12 of the end cap 10 is inserted through the open end face 21 of the molding main body 20, the front end of the rib-shaped engagement protrusion 13 in the insertion direction comes in contact with the insertion slope section 24a.

Since the engagement protrusion 13 is formed in the shape of a rib (protruding piece) that extends along the protrusion direction, the engagement protrusion 13 is guided along the insertion slope section 24a, and undergoes downward elastic deformation (see FIGS. 2A to 3C).

Therefore, the engagement protrusion 13 can be formed to have a sufficiently large height H. For example, the thickness of the bent section 23 may be set to 0.5 to 1.5 mm, and the height H of the engagement protrusion 13 may be set to about 2.5 to about 3.0 mm.

Figure 3B:
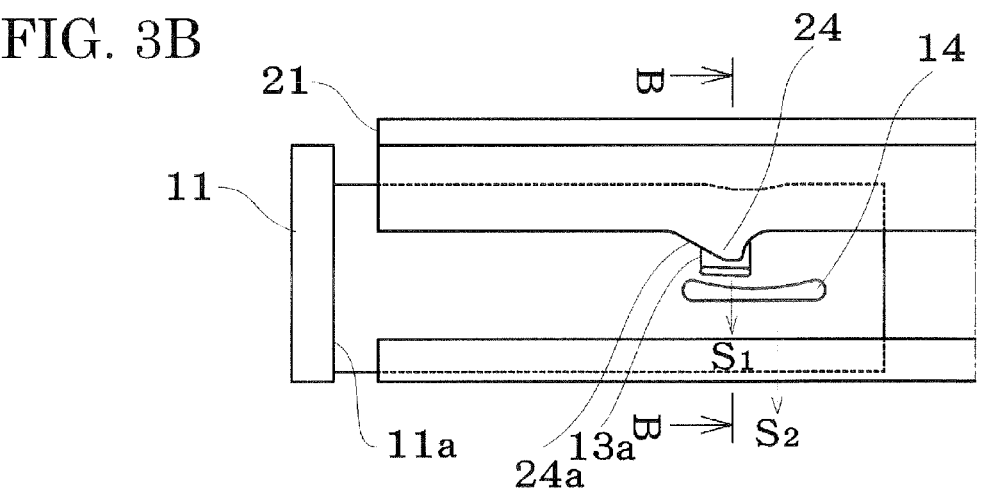

As illustrated in FIG. 3B, when the engagement protrusion 13 warps in the direction $S_1$, the hollow section 14 also warps in the direction $S_2$ due to the force applied by the engagement protrusion 13.

Figure 4A:
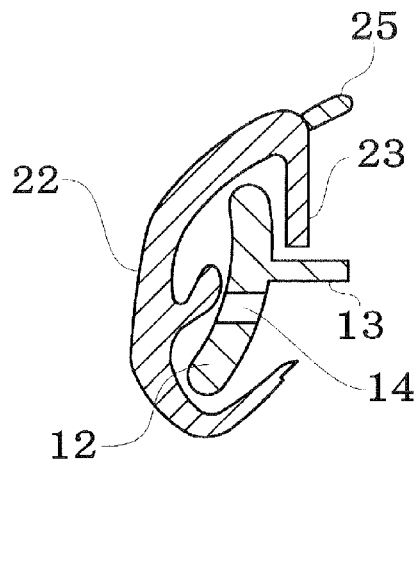
Figure 4B:
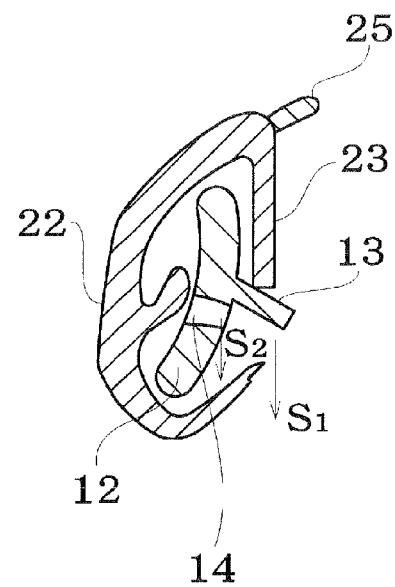

FIG. 4B (cross-sectional view) illustrates the state illustrated in FIG. 3B.

When the end cap 10 has been further inserted, and the engagement protrusion 13 has passed across the top of the hooking section 24, the engagement protrusion 13 is restored from elastic deformation in the direction $S_3$ along the hooking slope section 24b that is formed opposite to the insertion slope section 24a by forming the cut 24c.

Figure 3C:
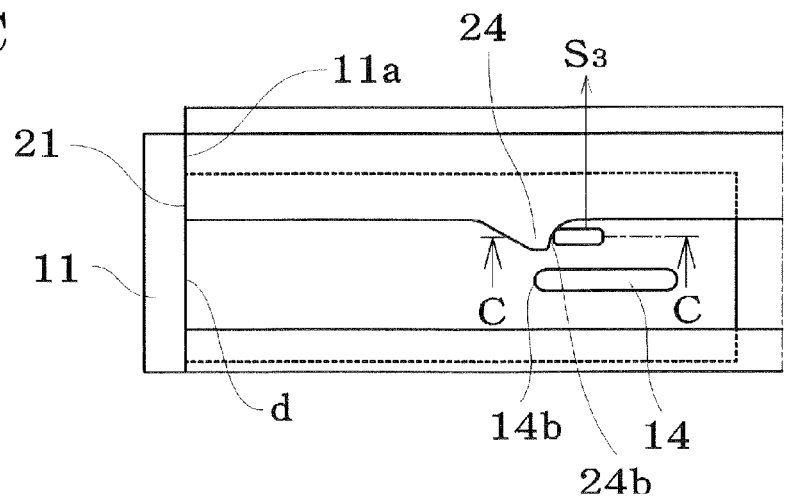
Figure 4C:
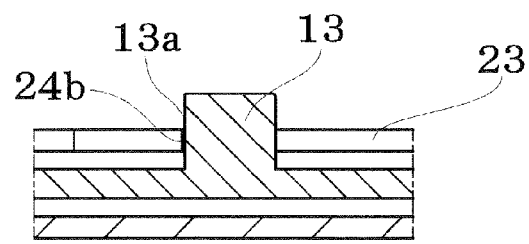
Figure 5A:
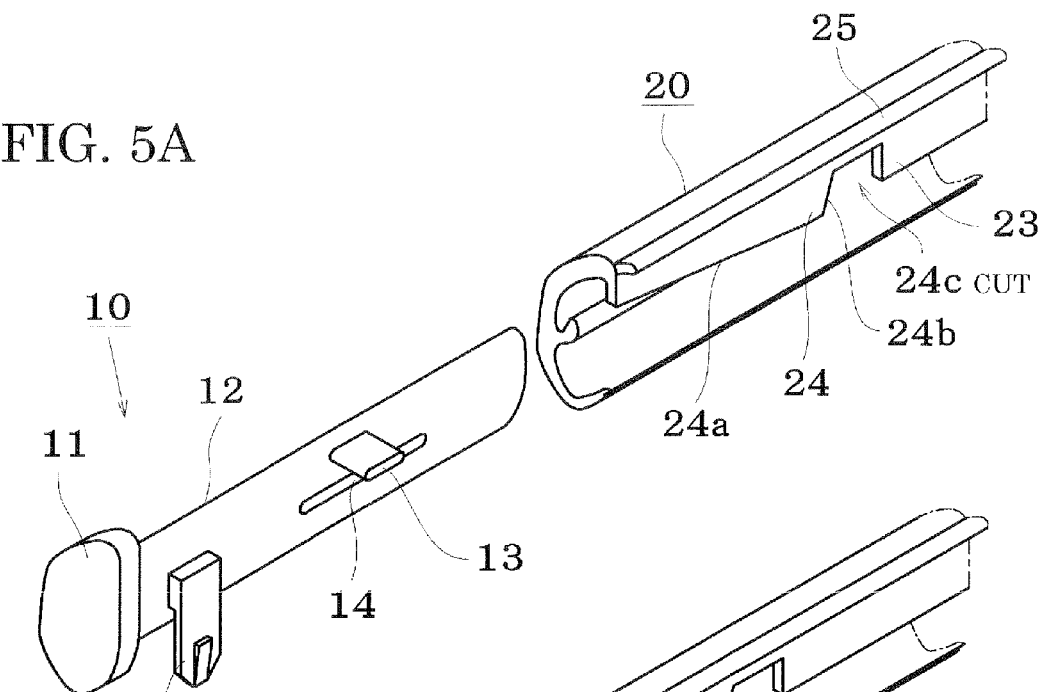
Figure 5B:
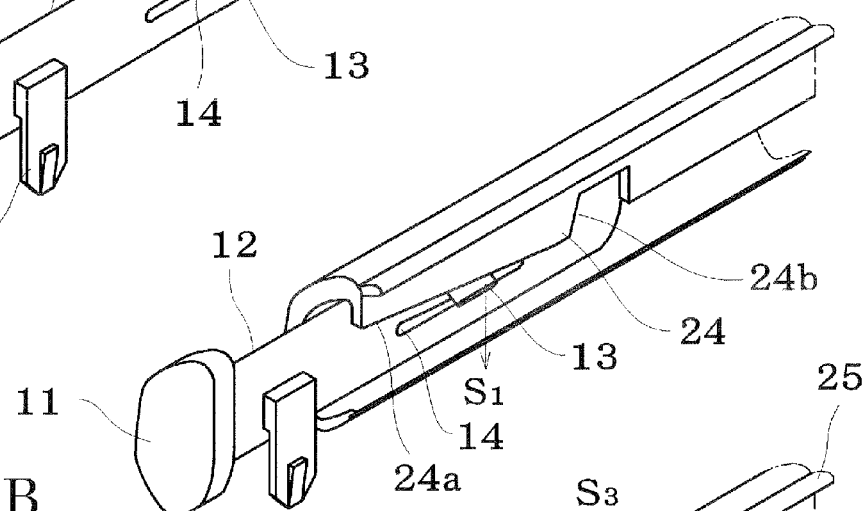
Figure 5C:
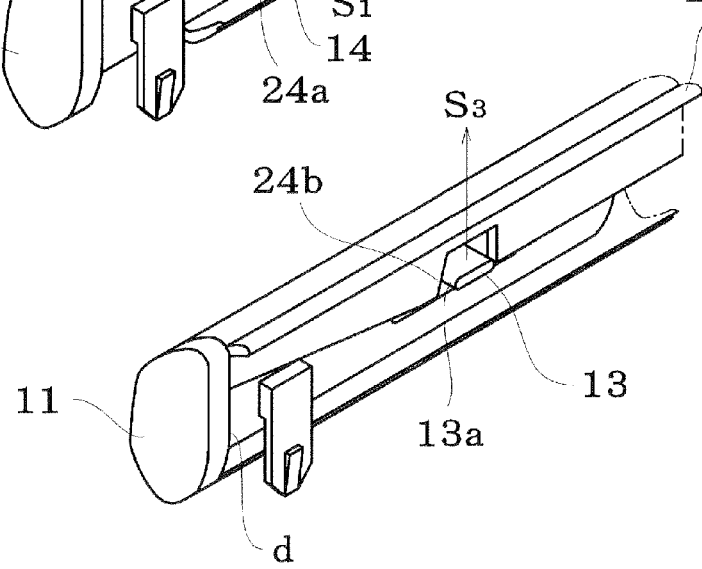
Figure 6A:
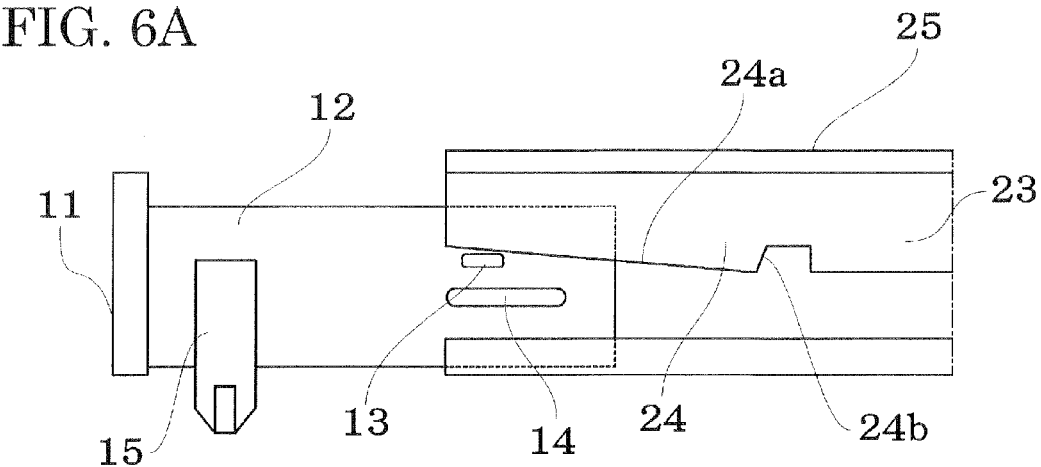
Figure 6B:
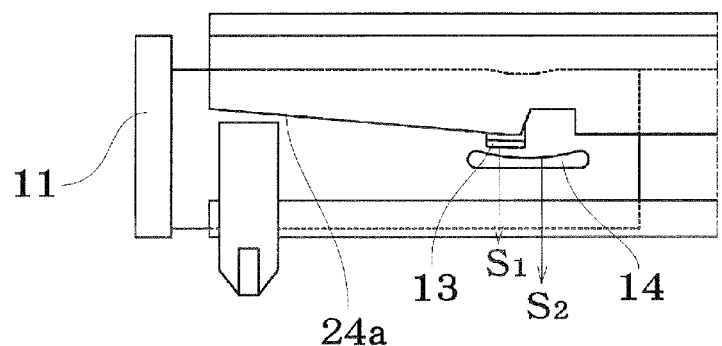
Figure 6C:
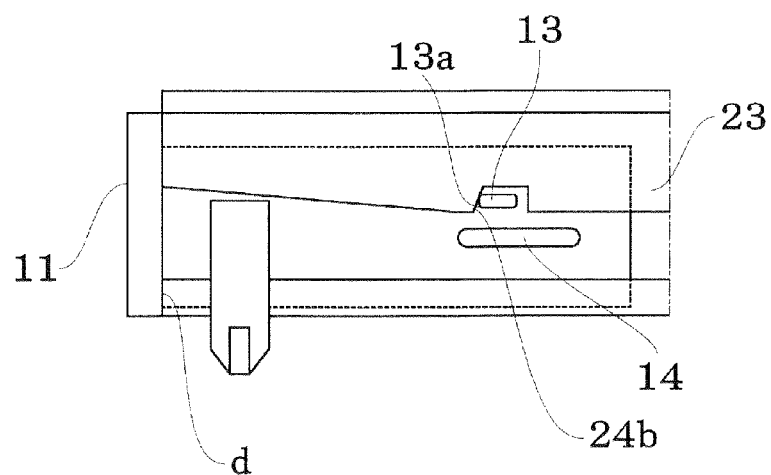

According to the first embodiment, since the hooking slope section 24b that comes in contact with an engagement side surface 13a of the engagement protrusion 13 slopes so that the bottom thereof is positioned on the back side of the molding main body 20 relative to the top thereof, the engagement protrusion 13 is restored from elastic deformation so that (in the direction in which) the end contact section 11a of the end cap 10 comes in close contact with the open end face 21 of the molding main body 20 (gap d between the end contact section 11a and the open end face 21 becomes zero), and a backlash of the end cap 10 in the interior-exterior direction (i.e., a direction that perpendicularly intersects the insertion direction) is suppressed (see FIGS. 3C and 4C).

Since the engagement protrusion 13 can be formed to have a sufficiently large height H, the engagement protrusion 13 reliably engages the hooking section 24.

According to the first embodiment, the entirety of the engagement protrusion 13 in the insertion direction is positioned between a front end 14a and a rear end 14b of the hollow section 14 (long hole) that is formed in the insertion section 12 to extend in the insertion direction, and the engagement side surface 13a of the engagement protrusion 13 is positioned on the side of the rear end 14b of the hollow section 14 relative to the center of the hollow section 14 (see FIGS. 3A to 3C). Therefore, the hooking section 24 comes in contact with the side surface of the engagement protrusion 13, and the hollow section 14 easily warps in the direction $S_2$ due to the force applied to the center area of the hollow section 14 during insertion of the end cap 10 (see FIG. 3B). However, the rib-shaped engagement protrusion 13 is rarely deformed in the forward/backward direction, and the hollow section 14 is also rarely deformed since the engagement protrusion 13 is positioned close to the rear end 14b of the hollow section 14 when a force is applied in the direction in which the end cap 10 is removed from the molding main body 20 (see FIG. 3C). Therefore, the end cap 10 is not easily removed from the molding main body 20.

FIGS. 5A to 6C illustrate a second embodiment. As illustrated in FIGS. 5A to 6C, the insertion section 12 of the end cap 10 is provided with a mounting section 15 that is mounted on a door after inserting the end cap 10 into the molding main body 20, and the bent section 23 of the molding main body 20 has a configuration in which the hooking section 24 and the hooking slope section 24b are formed by foaming the insertion slope section 24a that gradually slopes from the open end face 21, and forming the cut (recess) 24c on the back side relative to the insertion slope section 24a.

In this case, the engagement protrusion 13 and the hollow section 14 undergo elastic deformation in the same manner as described above (see FIGS. 6A to 6C).

FIGS. 7A to 7D illustrate a third embodiment. As illustrated in FIGS. 7A to 7D, the bent section 23 of the molding main body 20 is provided with an engagement protrusion 26 (protruding piece), and the insertion section 12 of the end cap 10 is provided with an insertion slope section 16a, a hooking section 16, and a hooking slope section 16b that is formed by forming a cut 16c.

In this case, the engagement protrusion 26 of the molding main body 20 undergoes elastic deformation in the direction $S_1$ (upward direction in FIGS. 7A to 7D) that perpendicularly intersects the insertion direction.

Figure 7A:
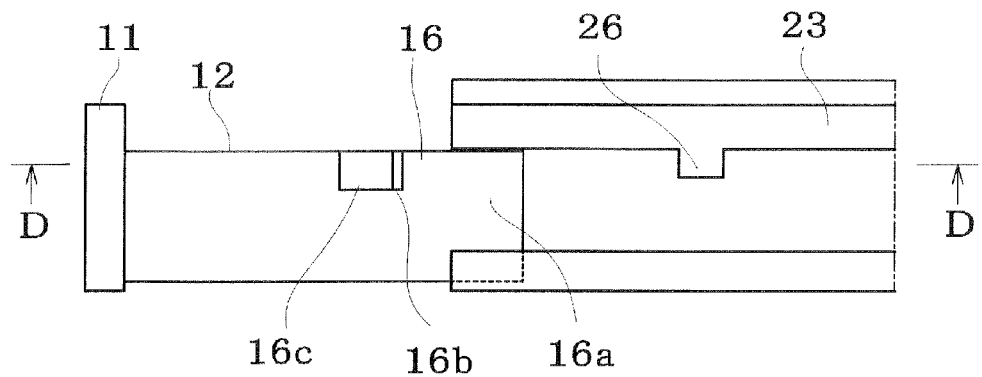
Figure 7B:
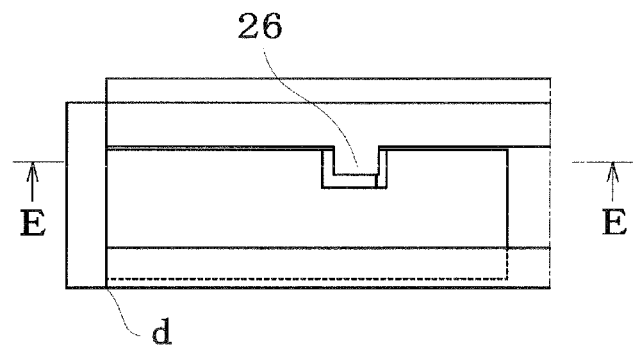
Figure 7C:
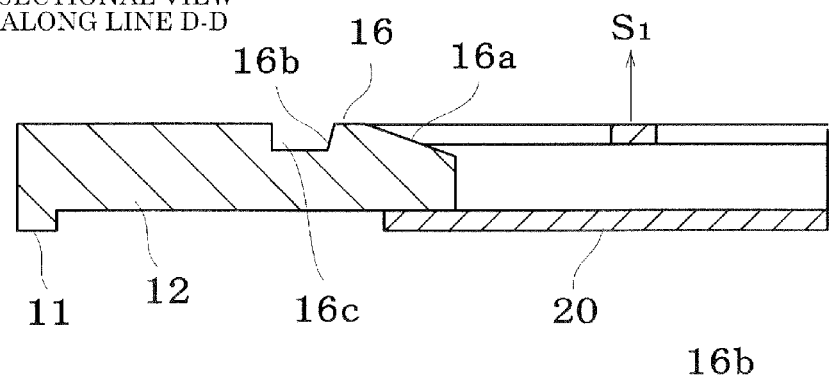
Figure 7D:
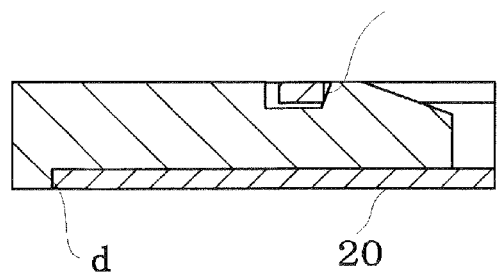

The engagement protrusion 26 is restored from elastic deformation, and the end cap 10 is hooked (held) (see FIGS. 7B and 7D). A backlash is absorbed by the hooking slope section 16b.

Figure 8:
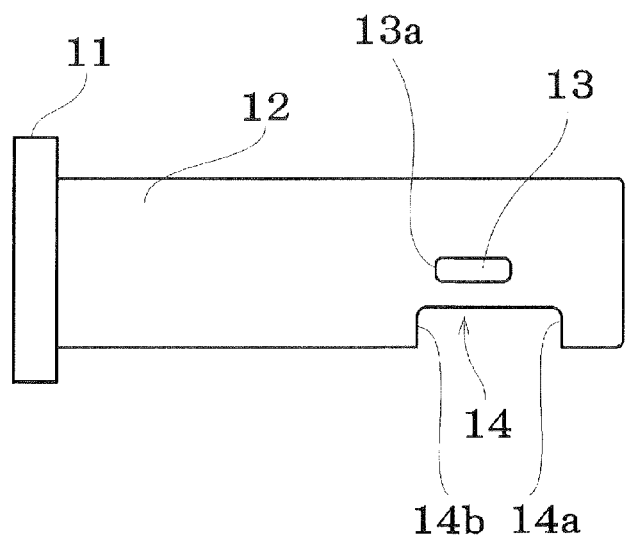
FIG. 8 illustrates the end cap according to the fourth embodiment.
Figure 9:
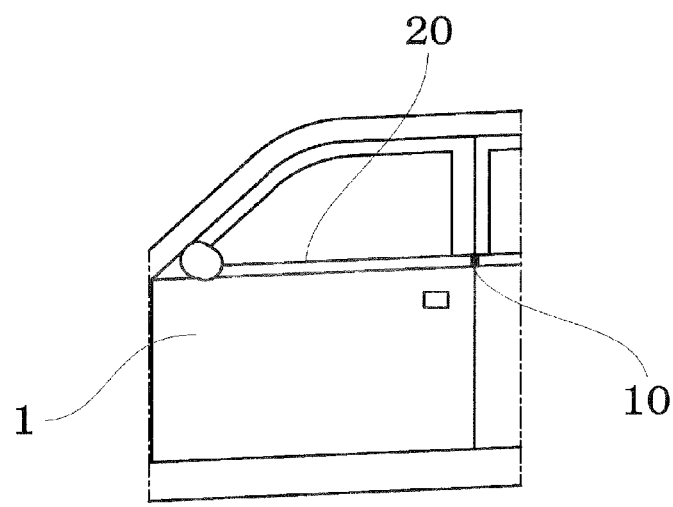
FIG. 9 illustrates an example in which a molding is attached to a door.
Figure 10:
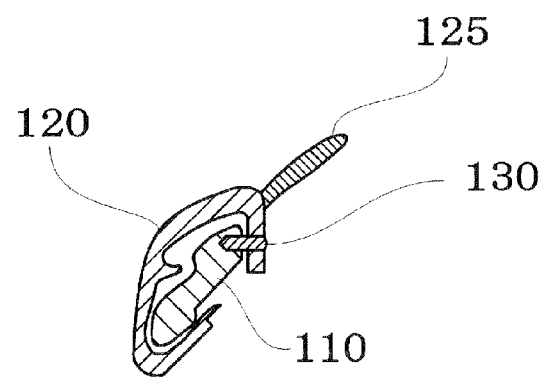
FIG. 10 illustrates an example of a related-art end cap fitting structure.

FIG. 8 illustrates a fourth embodiment. As illustrated in FIG. 8, the hollow section 14 is formed in the insertion section 12 of the end cap in the shape of the letter "C" in a side view.

In this case, deformation also occurs in the same manner as in the first to third embodiments.

INDUSTRIAL APPLICABILITY

The end cap according to the embodiments of the invention may be used to cover the end of a molding that is attached to the exterior of a car body, or cover the end of a molding that s attached to a car door.

The invention claimed is:

1. A molding end cap that is fitted into an end of a molding main body, the molding end cap comprising:
   an end section that closes an open end of the molding main body; and
   an insertion section that protrudes from the end section, and is inserted into an opening of the molding main body,
   the molding main body including an outer surface section, and a bent section that is bent inward from the outer surface section on an inner side of the molding main body,
   one of the insertion section of the end cap and the bent section of the molding main body including an engagement protrusion, and the other of the insertion section of the end cap and the bent section of the molding main body including an insertion slope section and a hooking section, the engagement protrusion coming in sliding contact with the insertion slope section, and undergoing elastic deformation in a deformation direction that perpendicularly intersects an insertion direction when the insertion section of the end cap is inserted into the opening of the molding main body, and the hooking section being formed by forming a cut on a back side relative to the insertion slope section, and holding the engagement protrusion in a state in which the engagement protrusion is restored from elastic deformation, and
   the engagement protrusion being formed in a shape of a rib that ensures that the engagement protrusion is deformed to only a small extent in the insertion direction, but easily undergoes elastic deformation in the deformation direction.

2. The molding end cap as defined in claim 1,
   the insertion section of the end cap including the engagement protrusion that is positioned on a back side of the insertion section, and protrudes in a direction that perpendicularly intersects the insertion direction, and
   the bent section of the molding main body including the insertion slope section that causes the engagement protrusion to undergo elastic deformation in a vertical direction when the end cap is inserted into the molding main body, and the hooking section that is formed by forming the cut on the back side relative to the insertion slope section.

3. The molding end cap as defined in claim 2,
   a side surface of the hooking section of the molding main body being formed by a hooking slope section, the hooking slope section being in a shape of a slope that is formed so that a bottom thereof is positioned on a back side of the molding main body relative to a top thereof.

4. The molding end cap as defined in claim 2,
   the insertion section of the end cap including a hollow section that extends along the insertion direction, the hollow section being positioned offset relative to the engagement protrusion toward the deformation direction, and the engagement protrusion undergoing elastic deformation at a position of a base end thereof through deformation of the hollow section.

5. The molding end cap as defined in claim 4,
   the engagement protrusion being positioned between a front end and a rear end of the hollow section in the insertion direction, and an engagement side surface of the engagement protrusion being positioned on a side of the rear end of the hollow section relative to a center of the hollow section in the insertion direction.

6. The molding end cap as defined in claim 3,
   the insertion section of the end cap including a hollow section that extends along the insertion direction, the hollow section being positioned offset relative to the engagement protrusion toward the deformation direction, and the engagement protrusion undergoing elastic deformation at a position of a base end thereof through deformation of the hollow section.

\* \* \* \* \*